United States Patent [19]

Orlandea et al.

[11] 4,209,072
[45] Jun. 24, 1980

[54] VEHICLE DRIVE AND SUSPENSION SYSTEM

[75] Inventors: Nicolae Orlandea, Davenport, Iowa; Jack C. Wiley, Moline, Ill.

[73] Assignee: Deere & Company, Moline, Ill.

[21] Appl. No.: 910,661

[22] Filed: May 30, 1978

[51] Int. Cl.$^2$ .................. B60G 19/00; B60K 17/32
[52] U.S. Cl. .................. 180/245; 74/665 GC; 180/9.54; 280/6.11
[58] Field of Search ............ 180/49, 51, 52, 44 R, 180/27, 24.05, 24.09, 24, 9.54, 41; 280/6 R, 6 H, 6.11, 111, 112 A, 112 R; 74/665 GB, 665 GC, 665 F

[56] References Cited

U.S. PATENT DOCUMENTS

| | | | |
|---|---|---|---|
| 1,736,391 | 11/1929 | Christie | 180/24.05 |
| 2,038,843 | 4/1936 | Jones | 180/27 |
| 2,828,137 | 3/1958 | Wagner | 280/111 |
| 3,680,887 | 8/1972 | Beck | 280/6 H |
| 3,712,404 | 1/1973 | Walquist | 280/6 H |
| 4,003,443 | 1/1977 | Boughers | 280/112 A |

Primary Examiner—John J. Love
Assistant Examiner—Randall A. Schrecengost

[57] ABSTRACT

A drive and suspension system for a longitudinally extending vehicle includes a differential having a pair of laterally extending output shafts. The output shafts support a pair of longitudinally extending gear train supports which journal and enclose a pair of longitudinally extending gear trains driven off the output shaft to drive the vehicle's drive wheels. The gear train supports, which are pivotal relative to the output shafts, are connected proximate the drive wheels to a pair of spring suspensions which in turn are connected to the ends of a laterally extending walking beam which is pivotable on a longitudinal axis of the vehicle.

11 Claims, 6 Drawing Figures

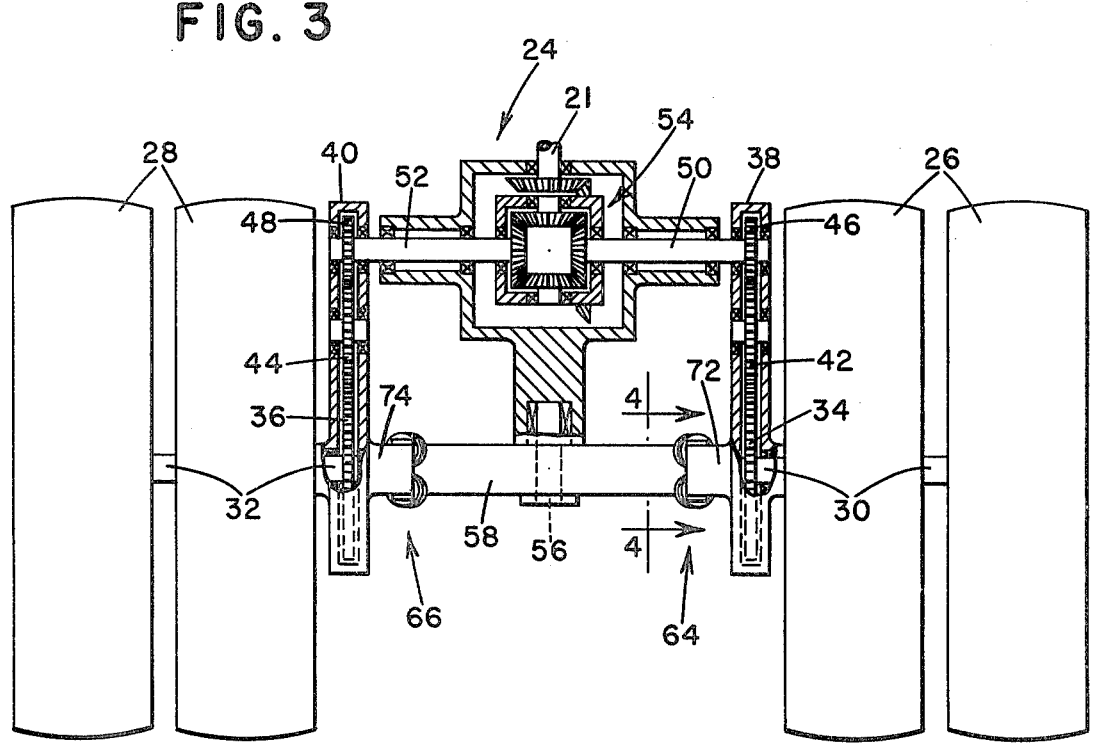
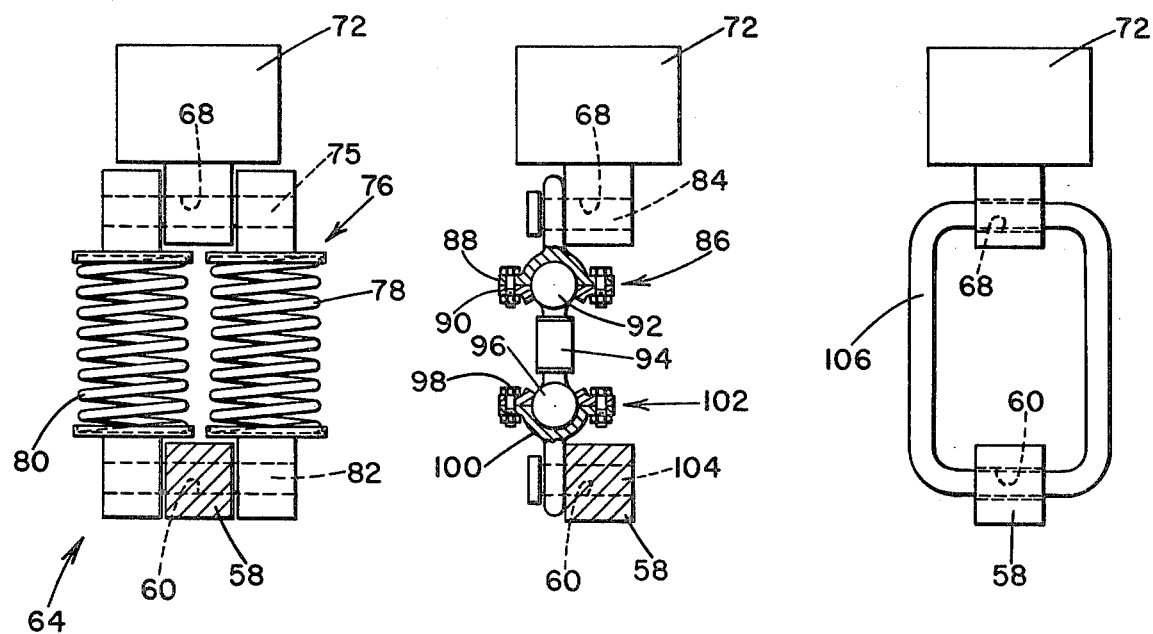

VEHICLE DRIVE AND SUSPENSION SYSTEM

BACKGROUND OF THE INVENTION

The invention relates generally to four-wheel drive vehicles in which relative rotation occurs between the front and rear differentials with respect to their common input shaft axis and more particularly to a four-wheel drive tractor in which this relative rotation is eliminated by longitudinally extending drive gearing to the wheels from the differential coupled with a laterally extending walking beam suspension connected to the wheels.

In the past, four-wheel drive tractors were articulated around a vertical axis to provide steering control and the front axle and differential were free to oscillate around a longitudinal axis to keep all four wheels on the ground over rough, uneven terrain. This configuration permits relative rotation of the front and rear differentials and results in the relative rotation due to traversing rough terrain to be imparted as high impact shock torques on the drive train. These high shock torques often result in premature failures of the drive train and generally uneven power transmission from the engine to the drive wheels.

SUMMARY OF THE INVENTION

The present invention provides roll articulation of a four-wheel drive tractor without having relative roll or rotation between the front and rear differentials.

The present invention further provides an improved suspension by reduction of lateral and vertical motions inputted to the tractor body as the wheels traverse rough terrain by limiting movement of the wheels to vertical movement with respect to the vehicle body.

The above and additional advantages of the present invention will become apparent to those skilled in the art from a reading of the following detailed description when taken in conjunction with the accompanying drawings.

BRIEF DESCRIPTION OF THE DRAWINGS

FIG. 3 is a partial plan view, partially in section, showing the preferred embodiment of the present invention;

FIG. 4 is a side view taken along line 4—4 of FIG. 3 showing a portion of the preferred embodiment;

FIG. 5 is a side view, partially in section, similar to FIG. 4 showing an alternate embodiment of the present invention; and FIG. 6 is a side view similar to FIG. 4 of another alternate embodiment of the present invention.

DESCRIPTION OF THE PREFERRED EMBODIMENTS

Figure 1:
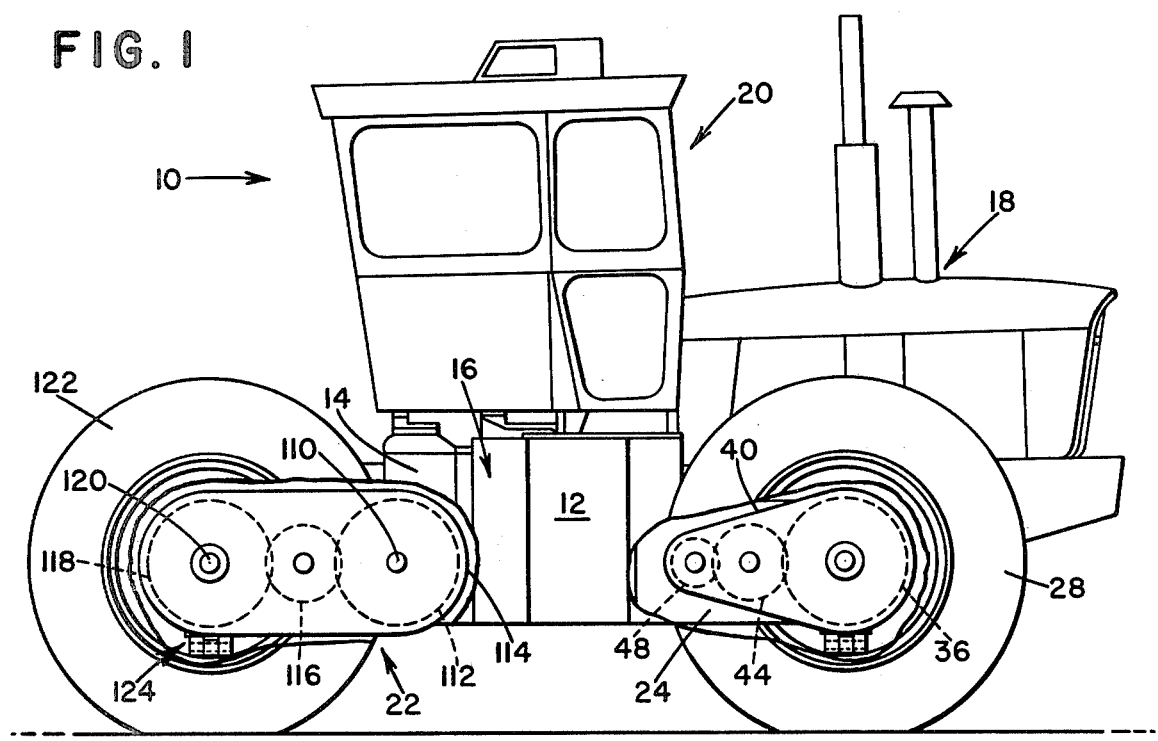
FIG. 1 is a side view, partially in section, of a four-wheel drive tractor embodying the perferred embodiment of the present invention on the front wheels and an alternate embodiment on the rear wheels.

Referring now to FIG. 1, therein is shown a four-wheel drive articulated tractor 10 which includes front and rear tractor bodies 12 and 14 joined by an articulation joint generally designated by the numeral 16. The front tractor body 12 carries an engine 18 and an operator's cab 20.

The engine 18 drives through various gearing (not indicated) to a common input shaft 21 (shown in FIG. 3) for a rear differential 22 and a front differential 24.

Figure 2:
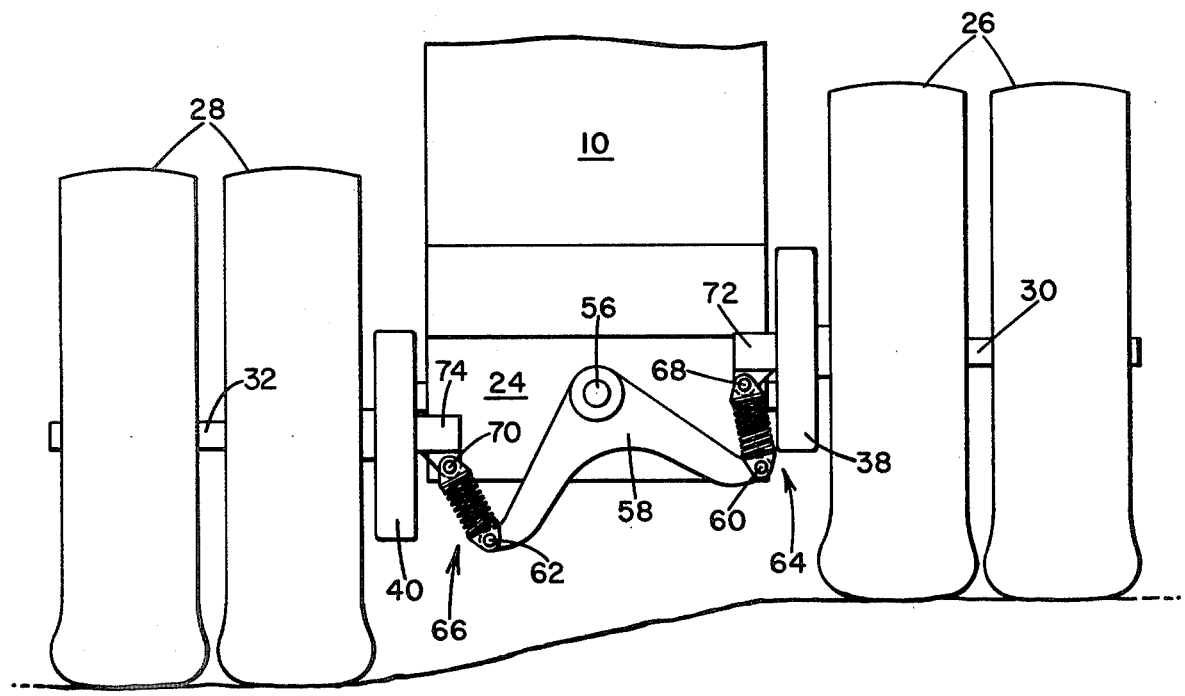
FIG. 2 is arfront view of the tractor showing the preferred embodiment of the present invention.

Taking the operator's seated position as a reference point, it may be seen that the tractor 10 has a pair of left front wheels 26 on the operator's left and a pair of right front wheels 28 on the operator's right as seen in FIG. 2. The left and right front wheels 26 and 28 are respectively rotatable on left and right front axles 30 and 32.

Referring now to FIG. 3, therein is shown the left and right front wheels 26 and 28 with their respective left and right front axles 30 and 32 carrying left and right axle gears 34 and 36, respectively. The left and right front axles 30 and 32 are respectively journaled in left and right gear train supports 38 and 40 which respectively encircle the left and right axle gears 34 and 36.

As may be seen from both FIGS. 1 and 3, the left and right gear train supports 38 and 40 respectively journal left and right intermediate gears 42 and 44 which are smaller than the left and right axle gears 34 and 36 with which they respectively drivingly mesh. The left and right intermediate gears 42 and 44 respectively mesh with smaller left and right output gears 46 and 48 which are respectively secured to left and right output shafts 50 and 52 which extend laterally outward from conventional differential gears 54 in the front differential 24.

The front differential 24 which is rigidly secured to the front tractor body 12 includes an extension into which a pivot pin 56 is rotatably disposed. The pivot pin 56 is connected to a walking beam 58 which may be best seen in FIG. 2. The walking beam 58 has two equal length legs which terminate in holes 60 and 62 which are respectively adapted for assembly with left and right suspension assemblies 64 and 66 which respectively depend from holes 68 and 70 in left and right support extensions 72 and 74, respectively, on the left and right gear train supports 38 and 40, respectively.

Referring to FIG. 4, therein is shown the preferred embodiment for the left and right suspension assemblies 64 and 66 with the left suspension assembly 64 being shown. A pin 75 is inserted through the hole 68 to support a spring assembly 76 which contains springs 78 and 80 which support a pin 82 which is inserted through the hole 60 in the walking beam 58.

Referring now to FIG. 5, therein is shown an alternate embodiment of the left suspension assembly 64, called a homokinetic linkage, in which a pin 84 is inserted into the hole 68 to support an upper homokinetic joint 86 which is comprised of a cap 88 cooperating with a collar 90 to hold a ball 92 which is one end of a support member 94. The opposite end of the support member 94 includes a ball 96 and a collar 98 cooperating with a cap 100 to define a lower homokinetic joint 102. The lower homokinetic joint is joined to the walking beam 58 by a pin 104.

Referring now to FIG. 6, therein is shown a further alternate preferred embodiment of the left suspension assembly 64 in which a rectangular chain link 106 is passed through the holes 60 and 68 so as to allow relative lateral and longitudinal movement between the left support extention 72 and the walking beam 58.

Referring back to FIG. 1, it should be understood that the tractor 10 will be generally constructed with the rear differential 22 rigidly connected to the rear tractor body 14 with the output shafts of the rear differential 22 being the axles of the rear wheels.

However, an alternate embodiment of the present invention which could also be used with either the front or rear differential 24 or 22 is shown in conjunction with the rear differential 22. The rear differential 22 on the tractor 10 will only be described with respect to the right side for purposes of simplification.

The rear differential 22 has a laterally extending output shaft 110 on which an output gear 112 is secured and on which a gear train support 114 is journaled. An intermediate gear 116 which is smaller than the output 112 meshes therewith and further meshes therewith and further meshes with an axle gear 118 which is journaled to a rear axle 120. The output gear 112 is provided with the same number of teeth as the axle gear 118.

The rear wheels 122 is provided with a rear walking beam suspension 124 which is similar to that used for the front of the tractor 10 as shown in FIG. 2.

In operation, the engine 18 driving through various gearing will drive both the rear and front differentials 22 and 24 by the common input shaft 21. The drive input from the common input shaft 21 into the front differential 24 will be split between the left and right output shafts 50 and 52 to respectively drive the left and right front wheels 26 and 28 through the gear trains disposed respectively in the left and right gear train supports 38 and 40. With the left and right front wheels 26 and 28 running over level ground, the left and right axles 30 and 32 will be coaxial such that the left and right suspension assemblies 64 and 66 will support the extremeties of the walking bearm 58 at equal heights from the ground with the pivot pin 56 supporting the front tractor body 12.

Over uneven terrain as shown in FIG. 2, if the left front wheels 26 were to lift, the left and right axles 30 and 32 would move to parallel but noncoaxial positions causing pivotal movements of the left and right gear train supports 38 and 40 relative to the front tractor body 12. The pivotal movements will cause only vertical movements to be imposed on the front tractor body 12 through the walking beam 58 which is rotated counterclockwise as viewed from the front of the tractor 10.

In the preferred embodiment of the suspensions 64 and 66 the springs 78 and 80 will accommodate the slight longitudinal arcing action due to the pivotal movement of the left and right gear train supports 38 and 40 when going over uneven terrain. They further compensate for the lateral movement of the extremeties of the walking beam 58 while providing shock absorption to additionally significantly improve ride comfort.

If a rigid connection is desired between the walking beam 58 and the left and right gear train supports 38 and 40, the alternate embodiment in FIG. 5 is used. Since there are a number of different types of movement involved, ball joints such as the upper and lower homokinetic joints 86 and 102 can be provided to allow homokinetic, or human ball and socket type, movement between the walking beam 58 and the left and right axles 30 and 32.

As a further alternate embodiment, a very inexpensive chain link 106 can be substituted for either the embodiments of FIG. 4 and FIG. 5. With the rectangular chain link 106, axial movement along the longitudinal extensin of the chain link 106 is possible to provide one direction of freedom and relative rotation of the chain link 106 in the holes 68 and 60 will allow a second degree of rotative freedom.

While the above arrangements will provide a compact drive and suspension system which will minimize high drive torques and improve ride comfort by restricting wheel movement to vertical movement with respect to the tractor 10, the slightly larger drive and suspension system shown on the rear differential 22 will totally eliminate all high impact shock torques on the drive train due to movement of the tractor 10 over even very rough terrain.

This feature is obtained by making the output gear 112 have the same number of teeth as the axle gear 118. In this situation, regardless of the number of teeth on the intermediate gear 116, the angular acceleration of the axle gear 118 will be the same as that of the output gear 112 regardless of the angular velocity of the gear train support 114 around the axle 110. As would be obvious to those skilled in the art this occurs, regardless of the rotation of the axle gear 118 around the output gear 112, because the relative motion between the axle gear 118 and the output gear 112 is strictly one of translation with no rotational component.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. A drive and suspension system for an engine driven four-wheel drive vehicle which encounters high impact shock torques while traversing rough terrain, comprising:
    (a) first and second pairs of ground engaging drive wheels;
    (b) first and second pairs of axles respectively connected to said first and second pairs of drive wheels for rotating said drive wheels;
    (c) first and second pairs of connecting drive means respectively connected to said first and second pairs of axles for rotating said axles;
    (d) main drive means carried by said four-wheel drive vehicle and driven by said engine, said main drive means comprising first and second output means respectively connected to said first and second pairs of connecting drive means for rotating said drive means;
    (e) first and second pairs of drive supporting means carried by said four-wheel drive vehicle and pivotal proximate said first and second output means for rotatably carrying said first and second pairs of connecting drive means;
    (f) pairs of beam means pivotally secured to said four-wheel drive vehicle and comprising first and second ends proximate said first and second pairs of drive support means; and
    (g) first and second pairs of suspension means respectively connecting said first and second ends of said beam means to said first and second pairs of drive supporting means.

2. The system of claim 1 wherein said first and second pairs of connecting drive means comprises first and second pairs of gear trains for equally rotating said first and second pairs of axles with respect to said first and second output means, independent of pivotal movements of said first and second pairs of drive supporting means.

3. The system of claim 1 wherein said first and second pairs of suspension means comprises first and second pairs of springs for attenuating shocks between said first and second pairs of drive wheels and said four-wheel drive vehicle.

4. The system of claim 1 wherein said first and second pairs of suspension means comprises first and second pairs of rectangular chain link members for allowing longitudinal and lateral relative motion between said first and second pairs of drive wheels and said four-wheel drive vehicle.

5. A drive and suspension for an engine driven four-wheel drive tractor with a longitudinally and laterally extending body which encounters high impact shock torques while traversing rough terrain, comprising:

(a) first and second pairs of ground engaging drive wheels;

(b) first and second pairs of axles respectively connected to said first and second pairs of drive wheels for rotating said drive wheels;

(c) first and second pairs of gear trains respectively connected to said first and second pairs of axles for rotating said axles;

(d) a differential carried on said tractor body and driven by said engine, said differential comprising first and second coaxial rotary output shafts laterally extending outward and respectively connected to said first and second pairs of gear trains for rotating said gear trains;

(e) first and second pairs of gear train supports carried proximate said differential respectively, pivotal relative to said first and second output shafts for rotatably carrying said first and second pairs of gear trains;

(f) a pair of laterally extending walking beams, each beam disposed laterally between said first and second pairs of gear train supports and pivotally secured to said four-wheel drive tractor equidistant therefrom proximate said differential, said pair of beams comprising spaced apart first and second ends respectively proximate said first and second pairs of gear train supports; and (g) first and second pairs of suspension means respectively connecting said first and second ends of said pair of beams to said first and second pairs of gear train supports.

6. The system of claim 5 wherein said first and second pairs of gear trains comprises first and second pairs of gear means for equally rotating said first and second pairs of axles with said first and second output shafts independent of pivotal movements of said first and second pairs of gear train supports.

7. The system of claim 5 wherein said first and second pairs of suspension means comprises first and second pairs of springs for attenuating shocks between said first and second pairs of drive wheels and said four-wheel drive tractor.

8. The system of claim 5 wherein said first and second pairs of suspension means comprises first and second pairs of rectangular chain link members for allowing longitudinal and lateral relative motion between said first and second pairs of drive wheels and said four-wheel drive tractor.

9. The system of claim 5 wherein each gear train comprises an axle gear, at least one intermediate gear and an output gear.

10. The system of claim 9 wherein said axle gear and said output gear contain the same number of gear teeth.

11. The system of claim 10 wherein said axle gear has the same angular acceleration as said output gear.

* * * * *

UNITED STATES PATENT OFFICE
CERTIFICATE OF CORRECTION

Patent No. 4,209,072     Dated 24 June 1980

Inventor(s) Nicolae Orlandea & Jack C. Wiley

It is certified that error appears in the above-identified patent and that said Letters Patent are hereby corrected as shown below:

Column 5, line 10, after "suspension" insert -- system --.

Signed and Sealed this

Fourteenth Day of April 1981

[SEAL]

Attest:

RENE D. TEGTMEYER

*Attesting Officer*     *Acting Commissioner of Patents and Trademarks*